United States Patent Office

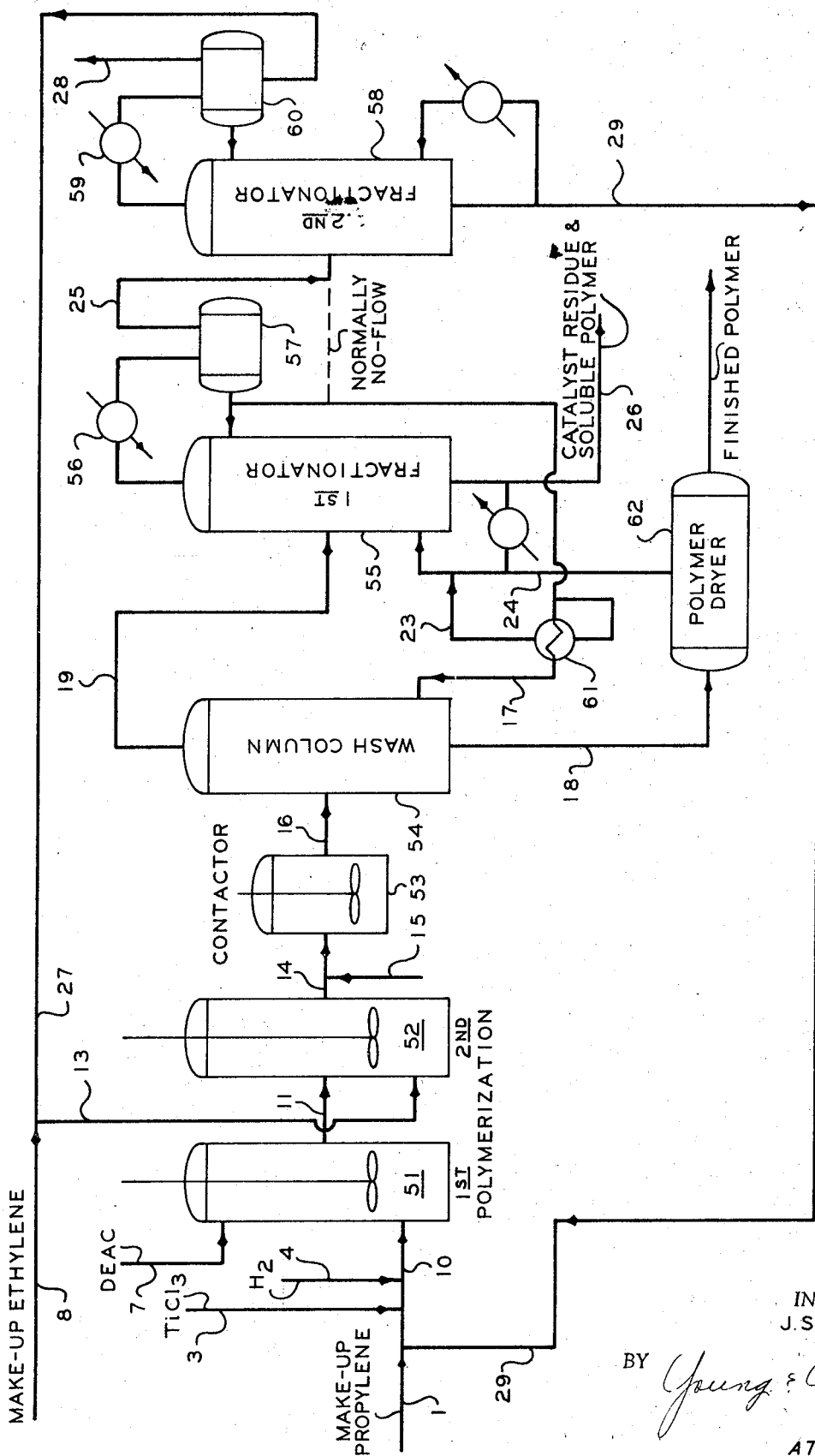

3,644,583
Patented Feb. 22, 1972

3,644,583
PRODUCTION AND RECOVERY OF A SOLID MIXED HOMO- AND COPOLYMER
Jack S. Scoggin, Bartlesville, Okla., assignor to Phillips Petroleum Company
Filed Apr. 23, 1969, Ser. No. 818,709
Int. Cl. C08f *15/00*
U.S. Cl. 260—878 B    3 Claims

ABSTRACT OF THE DISCLOSURE

A solid mixed homo- and copolymer product is produced by a combination of a catalyzed mass homo- and a catalyzed mass copolymerization and the solid recovered and washed with an impure fraction of the monomers so reacted, the fraction being obtained by a fractionation of unreacted excess monomers to produce a stream containing catalyst and any soluble polymer, a stream containing a mixture of the monomers, using a portion of the stream of monomers as said impure fraction, fractionating another portion thereof to obtain one of the monomers for the homopolymerization and a mixture of the monomers for said copolymerization. In an embodiment a mixed polypropylene-propylene-ethylene copolymer is produced and recovered and washed with a stream containing propylene and ethylene, there being recovered also a stream of propylene substantially free from ethylene for use in said homopolymerization and a stream containing propylene and ethylene for use in said copolymerization.

This invention relates to a process for the production of a solid mixed propylene-ethylene polymer. It also relates to a combination operation in which a homopolymerization zone and a copolymerization zone are operated in conjunction with a propylene-ethylene separation system and a polymer wash zone.

According to a concept of the present invention a solid mixed homo- and copolymer product is produced by a combination of a catalyzed mass homo- and a catalyzed mass copolymerization and the solid recovered and washed with an impure fraction of the monomers so reacted, the fraction being obtained by a fractionation of unreacted excess monomers to produce a stream containing catalyst and any soluble polymer, a stream containing a mixture of the monomers, using a portion of the stream of monomers as said impure fraction, fractionating another portion thereof to obtain one of the monomers for the homopolymerization and mixture of the monomers for said copolymerization.

According to another concept of the invention it provides a process for the production of a solid mixed propylene-ethylene-polymer, prepared by first polymerizing propylene and then polymerizing further in the presence of ethylene, recovering a solid mixed polymer thus produced, washing the solid polymer with an impure propylene-containing stream, passing the washing effluent to a fractionation zone wherefrom a bottoms containing soluble polymer, catalyst residues and any other additives are removed and from an upper portion of which there is obtained an impure propylene stream containing ethylene used as said wash fluid and as feed to a further fractionation zone from which there is obtained as bottoms a substantially pure propylene substantially free from any ethylene and an overhead containing ethylene and some propylene, the substantially free propylene stream being used for the homopolymerization of propylene and the remaining stream being used for the copolymerization. In another of its concepts the invention provides a combination of steps in which an impure wash liquid is used to treat a polymerization effluent to wash solid polymer therein and then the impure stream is separated to recover therefrom at least one pure stream suitable for homopolymerization and another stream suitable for copolymerization.

In a further concept of the invention it provides apparatus as herein described for effecting the process or method of the invention.

It has now occurred to me now that a mixed propylene-ethylene copolymer can be produced and effectively recovered by using as a washing stream an impure propylene, ethylene-containing stream, and that by so doing a fractionation zone arrangement can be accomplished which will consideraby save on fractionation capacity and costs. Thus, there can be obtained from two fractionators or two fractionating zones three streams of different compositions, each of no higher purity than is required. Thus, there can be obtained a relatively high purity propylene stream for the homopolymerization of propylene. There can be obtained a reasonably pure propylene-ethylene stream suitable for copolymerization of the two components therein and a less pure propylene-ethylene stream suitable for washing the solid polymer product free of catalyst residues and soluble polymer.

The polymers of the invention, usually block copolymers, of special interest are those made, say, by mass polymerizing propylene by itself during the initial step to form polypropylene. Ethylene is then added to the polymerization system and polymerized simultaneously with additional propylene polymerization to form a random copolymer of ethylene and propylene. It is believed that the ethylene-propylene copolymer grows largely on the ends of the previously produced polypropylene chains, thus producing molecules containing a block of pure polypropylene plus a block of random ethylene-propylene copolymer. Such a product is especially useful as high-impact polypropylene when produced according to my invention, i.e., it has a low brittleness temperature and acceptable flexural modulus.

The same or different catalyst can be used in the two polymerizations. It is now more practical to simply add additional catalyst of the same kind as used in the first reaction to accomplish the second.

An object of the present invention is to provide a process for the production of an ethylene-propylene copolymer. Another object of the invention is to provide a more efficient process for the recovery of such a polymer from polymerization effluent. It is a still further object of the invention to provide a more simple, yet effective, fractionation arrangement in combination with the production of such a mixed polymer as herein described.

Other aspects, concepts, and objects and the several advantages of the invention are apparent from a study of this disclosure, the drawing and the appended claims.

According to the present invention there is provided a process for the production of a solid mixed propylene-ethylene polymer which comprises in a homopolymerization zone homopolymerizing, in liquid phase under homopolymerizing conditions and with a suitable catalyst, propylene in the substantial absence of ethylene, then, in a copolymerization zone under copolymerizing conditions and with a suitable catalyst, copolymerizing in liquid phase ethylene and propylene with homopolymer produced in said homopolymerization zone, recovering from said copolymerization zone a solid polymeric mass containing a mixed ethylene-propylene copolymer, containing a portion composed substantially only of polypropylene and a portion of ethylene-propylene copolymer, separating said solid polymeric mass from liquid phase, unreacted ethylene, propylene, catalyst and any liquid-phase soluble polymer by washing the same with an impure liquid propylene-containing liquid stream also containing ethylene, recovering said solid polymeric mass, passing the thus used impure liquid propylene liquid stream to a first fractination zone, therein separating from the hydrocarbons as a bottoms stream, catalyst and soluble polymer, and as an overhead, a stream containing hydrocarbons, including ethylene and propylene, using a portion of said overhead as said impure liquid propylene-containing liquid stream for washing said solid polymeric mass, passing another portion of said overhead to a second fractionation zone, therein separating a first substantially ethylene-free propylene stream and second stream containing ethylene and propylene, passing said first stream to said homopolymerization zone and passing said second stream to said copolymerization zone.

Since a wide variety of catalyst systems can be employed in the polymerization, it is not intended to limit the invention to any particular catalyst system. Catalyst systems suitable for use in the polymerization are those which are capable of polymerizing a mono-1-olefin in a mass polymerization and under conditions such that solid polymer in particle form is produced. Catalyst systems suitable for use can be broadly defined as comprising an organometal compound and a metal salt. A particularly suitable catalyst is one which comprises (a) a compound having the formula $R_nMX_m$, wherein R is an alkyl, cycloalkyl or aryl radical or combinations of these radicals such as alkaryl, aralkyl and alkylcycloalkyl, X is hydrogen or a halogen, including chlorine, bromine, iodine and fluorine, M is aluminum, gallium, indium or thallium, $n$ is from 1 to 3, inclusive, $m$ is from zero to 2, inclusive, and the sum of $m$ and $n$ is equal to the valence of the metal M, and (b) a halide of a metal of Groups IV-B, V-B, VI-B or VIII. The hydrocarbon radicals which can be substituted for R in the aforementioned formula include radicals having up to about 20 carbon atoms each. Radicals having 10 carbon atoms or less are preferred since the resulting catalyst composition has a greater activity for initiating the polymerization.

The metal halide component of the catalyst system is preferably a halide of a Group IV-A metal, i.e., titanium, zirconium, hafnium and germanium. However, it is to be understood that halides of metals of the other groups specified above, such as vanadium, molybdenum, tungsten, cobalt, and iron can also be employed in the catalyst system. The trichloride, trifluorides, tribromides, and triiodides, as well as the tetrachlorides, tetrafluorides, tetrabromides and tetraiodides of the various metals, can be used in the catalyst system, either individually or as mixtures of two or more of the metal halides. It is usually preferred to employ a trichloride, such as titanium trichloride, in the polymerization.

A now preferred catalyst system employed in the polymerizations comprises a dialkylaluminum chloride and titanium trichloride, the latter compound preferably being prepared by reduction of titanium tetrachloride in the presence of aluminum. The reduction product is preferably a complex having the formula $3TiCl_3 \cdot AlCl_3$. The reduction reaction is usually carried out at an elevated temperature, for example, at a temperature in the range of 360 to 600° F., preferably from 375 to 450° F.

The amount of catalyst employed in the polymerizations can vary over a rather wide range and will depend, at least to a certain degree, upon the particular catalyst system utilized.

Although not essential to the conduct of the polymerizations, it is often desirable to carry out the polymerizations in the presence of elemental hydrogen. When so operating, hydrogen is added in an amount sufficient to provide from 0.15 to 0.40 mol percent hydrogen in the liquid mono-1-olefin phase in the polymerization zones. The productivity of the catalyst is increased and certain properties of the polymer, e.g., hexural modulus, are improved.

The diketones are used to remove catalyst residue for the polymer product and those especially suitable for use in the practice of the present invention include alpha-diketones and beta-diketones. These diketones can also be defined as being selected from the group consisting of compounds having the formulas:

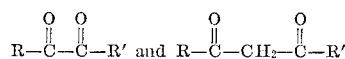

wherein R and R' are hydrocarbon radicals, such as alkyl, cycloalkyl and aryl. Examples of suitable alpha-diketones include the following:

2,3-butanedione,
2,3-pentanedione,
3,4-hexanedione,
4-methyl-2,3-pentanedione,
3,4-heptanedione, and the like.

Suitable beta-diketones include:

2,4-pentanedione (acetylacetone),
2,4-hexanedione,
2,4-heptanedione,
5-methyl-2,4-hexanedione,
2,4-octanedione, and the like.

A more full understanding of the invention can be obtained by referring to the drawing which is a flow diagram illustrating a preferred embodiment of the invention. While the drawing is described with regard to a process in which the monomers are polymerized with a specific catalyst system, it is to be understood that it is not intended to limit the invention to this specific embodiment.

In carrying out the invention, propylene is polymerized in liquid propylene as the reaction medium in the presence of a polymerization catalyst to produce propylene homopolymer. After a desired fraction of the propylene has polymerized, ethylene is added to the reaction mass and the polymerization process continued with the production of propylene-ethylene copolymer. The two polymerizations can be carried out at the same or different temperature levels. Preferably propylene is polymerized by itself at a temperature in the approximate range of 80 to 150° F. and the copolymerization of propylene and ethylene at a temperature below about 100° F.

The proportion of the propylene homopolymer and the propylene-ethylene copolymer can be varied widely with the propylene homopolymer portion generally constituting more than 50 percent, preferably about 75 to about 90 percent of the total polymer.

While two continuous reactors are shown in the drawing, a single batch reactor can be used. Alternatively, two batch reactors might be used with propylene homopolymer produced in the first passed to the second for copolymer production. If the continuous route is preferred, it is obvious that more than one continuous reactor can be used in each polymerization step.

Propylene is added to the polymerization reactor in the liquid state and ethylene may also be added as a liquid but it is generally more economical to use ethylene in the gaseous state.

Referring now to the drawing, make-up propylene 1 is passed together with recycle propylene 29 by 10 to propylene polymerization reactor 51. Not shown are conventional steps for purifying the propylene of catalyst poisons such as water, oxygen, etc. Such contaminants are conventionally removed by adsorption, extraction, etc. Catalyst ingredients, namely the titanium trichloride complex and the diethylaluminum chloride enter the system by 3 and 7, respectively. It is preferred, but not essential, to add the $TiCl_3$ complex to the propylene feed stream and the DEAC directly to the reaction mass. Hydrogen is added by 4.

A simple, pot-type, stirred reactor 51 is shown, although other conventional types may be used. Not shown are cooling coils and jackets, pressure and temperature controls, pumps, and other well-known reactor accessories.

The conditions employed in the propylene polymerization reactor will vary somewhat depending on the catalyst system used, production rate desired, heat removal capacity of the reactor, etc. Generally, the temperature will be between about 0 and 160° F. and the pressure sufficient to maintain the propylene in the liquid state, i.e., from 275 to 1000 p.s.i.g. Residence time in reactor 51 can range from about 1 to about 10 hours with a residence time of about 3 hours being preferred for conversion of a desired percentage of the propylene to polypropylene. Under the above-stated conditions of temperature and pressure, the polymer is produced as solid particles in reactor 51. Effluent from reactor 51 thus consists of a reactive slurry of solid polypropylene particles in liquid propylene together with catalyst and a small amount of soluble, low molecular weight polypropylene. The reactive slurry is passed directly into reactor 52 to which an ethylene concentrate is passed by 13. The reaction continues in reactor 52 with the polymerization of both propylene and ethylene to form the final, mixed propylene-ethylene copolymer. Additional catalyst of the same or different type added to reactor 51 may also be added to reactor 52 but is generally not required.

A random ethylene-propylene copolymer is produced in reactor 52 and it is believed that most of this copolymer grows onto the polypropylene molecules that were previously produced in reactor 51. The ratio of ethylene to propylene in the copolymer portion produced in reactor 52 can be adjusted to any desired value by varying the concentration of ethylene within the liquid propylene in reactor 52, this in turn being varied by varying the flow rate of ethylene concentrate stream 13 to reactor 52 and/or the concentration of ethylene in said stream 13. The ratio of propylene homopolymer to random ethylene-propylene copolymer in the final polymer product is easily adjusted by varying the amount of polymer produced in reactor 51 relative to that produced in reactor 52. If a high proportion of propylene homopolymer in the final product is desired, then reactor 51 will be much larger in size than reactor 52 or alternatively, several reactors may be used in the first polymerization zone and only one reactor in the second polymerization zone.

Effluent from reactor 52 containing the final polymer product, slurried in residual liquid propylene, is mixed with catalyst-removal agents, acetylacetone and propylene oxide, and the total blend passed into stirred contactor 53. The catalyst-removal agents react with the residual catalyst components in contactor 53 to convert said components to a soluble state for removal in wash column 54.

Treated effluent from contactor 53 is passed into the top of wash column 54 wherein the solid polymer particles settle slowly through a rising stream of liquid propylene. Countercurrent treatment of the polymer particles with the liquid propylene results in the removal overhead by 19 of a liquid propylene stream containing most of the catalyst residues and soluble polymer. Purified, washed polymer is removed from the bottom of wash column 18 and passed to drying steps such as flashing and extrusion for separation of residual liquid propylene from the final, dry polymer product. Gaseous propylene removed from the flashing and extrusion steps is passed by 24 into the lower portion of first fractionator 55 to which is also passed the overhead stream from wash column 19.

Fractionator 55 serves to separate the catalyst residues and soluble polymer from the substantial quantity of liquid propylene contained in stream 19. Said catalyst residues and soluble polymer together with a small amount of liquid propylene (to provide a pumpable stream of reduced viscosity) are removed from fractionator 55 by 26 and passed to recovery or other processing steps.

The overhead from fractionator 55, containing propylene, ethylene, and hydrogen, is partially condensed in cooler 56 and the effluent therefrom passed to accumulator 57 wherein the propylene-rich liquid phase separates from the non-condensed vapor phase. Part of the liquid phase is used as reflux for fractionator 55 and the remainder is passed by 17 to wash column 54. The propylene-rich, condensed portion of the overhead from fractionator 55 is thus advantageously used as wash liquid in column 54 without additional treatment.

According to the invention and as an especial feature thereof although stream 17 contains some ethylene, it is unnecessary to remove it for wash purposes and thus additional fractionation costs are avoided.

Thus, a specific concept of the invention provides in combination a fractionation from which there is relatively cheaply taken a wash stream, the concept being based upon a combination of factors, including that at the point of washing the polymer, the activity of the catalyst has been destroyed substantially and for this reason the removal of the catalyst residue and soluble polymer can be effected with an impure stream, that is, one containing substantial ethylene, thus saving substantial costs of purification and control.

The non-condensed portion from accumulator 57 is passed by pipe 25 into fractionator 58 which separates a very high purity propylene bottoms product from an overhead ethylene concentrate. The high-purity propylene is required in reactor 51 as feedstock for the preparation of the desired propylene homopolymer and is accordingly passed to said reactor by 29. The ethylene concentrate overhead from fractionator 58 is partially condensed by cooler 59 and the effluent therefrom passed to accumulator 60 from which non-condensed hydrogen is vented by 28. Part of the condensed portion is used to reflux fractionator 58 and the remainder is passed as feedstock to reactor 52 by 27. It is unnecessary to prepare a high-purity ethylene stream for use as feedstock in reactor 52 since a mixture of propylene and ethylene is required in said reactor for the production of the copolymer portion of the final polymer product. Therefore, fractionator 58 is made only efficient enough to separate a high-purity propylene bottoms from an ethylene concentrate (propylene being the minor component) overhead. Fractionation costs are thus greatly reduced.

Thus according to a concept of this invention there have been combined the factors that propylene must be pure in reactor 51 but that ethylene need not be in reactor 52 and that the wash liquid can be substantially "contaminated" with ethylene permitting a simplified fractionation scheme for the separation of a propylene-ethylene stream 19 into (1) a propylene concentrate stream 17 suitable for use in washing polymer free of impurities; (2) a very high-purity propylene product stream 29 required for preparation of propylene homopolymer; and (3) an ethylene concentrate stream 27 suitable for use in preparing propylene-ethylene copolymer.

The proportion of the polypropylene and polyethylene-propylene portions of the product can be varied widely. Generally, the predominantly polypropylene portion of the resulting copolymer product constitutes 50 to 90, preferably 75 to 85 percent by weight of the final product.

The conditions employed in conducting the polymerization will vary somewhat dipending upon the mono-1-olefin utilized. The polymerization temperature is generally in the range of 0 to 160° F. In general, the polymerization is conducted at a temperature such that solid polymer in particle form is obtained in the polymerization. The actual amount of solid polymer formed is also dependent upon the particular catalyst system used. It has been found that with the now preferred catalyst system, as described above, very high percentage of solid polymer with a minimum formation of soluble polymer is produced. The pressure employed in reactor 10 is sufficient to maintain the reactants in the liquid phase, e.g., a pressure in the range of 275 to 1000 p.s.i.g. The maximum pressure used is only limited by practical considerations, although it is generally undesirable to exceed a pressure of 2000 p.s.i.g. In the polymerization of propylene, the lower limit of pressure is about 225 p.s.i.g. at a polymerization temperature of about 90° F. The residence time in reactor 10 can range from about 1 to about 5 hours, with a residence time of about 3 hours being preferred.

The effluent stream recovered from the reactor comprises solid polymer, catalyst residue, soluble polymer and liquid propylene. The stream usually contains in the range of 25 to 40, preferably 35, weight percent solid polymer.

The polymer product prepared in accordance with this invention has utility in applications where solid plastics are employed. The polymer can be molded to form articles of any desired shape such as bottles and other containers for liquids. Furthermore, the product can be formed into fibers and piper by extrusion.

Acetylacetone is preferably added in admixture with propylene oxide. The amount of treating agent added in this manner may range from 1 to 5 times the stoichiometric equivalent, based on the amount of catalyst present. The contact time in the contact tank can vary within rather wide limits, e.g., from 5 minutes to 1 hour. However, it is usually preferred to use a contact time in the range of 20 to 30 minutes.

The following material balance is presented to illustrate in greater detail the operation of a propylene-ethylene copolymer plant employing the simplified fractionation scheme according to the invention.

60° F. The thus-cooled liquid propylene at 60° F. is passed to wash column 54. Flash vapors from the flash step are passed to a lower portion of fractionator 55 via line 23.

Fractionator 58 contains about 40 conventional trays, is about two feet in diameter and 75 feet in height, operates at a pressure of 310 p.s.i.a. and has a top temperature of 40° F. and a bottoms temperature of 120° F. The overhead vapors from fractionator 58 are cooled in cooler 59 to —20° F. using any conventional refrigeration system in said cooler.

All pumps, valves, controls and other operating accessories familiar to those skilled in the art have been omitted from the drawing and the discussion in order to simplify the presentation.

Polymerizable monomers which can be used in practicing the invention include: ethylene, propylene, butene-1, pentene-1, hexene-1, butadiene, isoprene, styrene, etc. Combinations of these monomers for respective homo- and copolymerization are: butene-1-ethylene, butene-1-propylene, pentene-1-propylene, hexene-1-propylene, isoprene-butadiene, styrene-butadiene, styrene-isoprene, etc.

Reasonable variation and modification are possible within the scope of the foregoing disclosure, the drawing and the appended claims to the invention the essence of which is a solid mixed homo- and copolymer product is produced by a combination of a catalyzed mass homo- and a catalyzed mass copolymerization and the solid re-

| Stream Number | (1) | (3) | (8) | (4) | (10) | (7) | (11) | (13) | (14) | (15) |
|---|---|---|---|---|---|---|---|---|---|---|
| | Make-up propylene | Catalyst | Make-up ethylene | Hydrogen | Total propylene to first polymerization | Catalyst | First polymerization effluent | Ethylene to second polymerization | Second polymerization effluent | Catalyst removal reagents |
| Component, lb./day: | | | | | | | | | | |
| Ethylene | | | 14,700 | | 30 | | | 34,960 | 21,660 | |
| Propylene | 105,534 | | | | 282,070 | | 188,500 | 9,380 | 188,600 | |
| Hydrogen | | | | 30 | 30 | | 30 | 10 | 40 | |
| Polypropylene | | | | | | | 91,040 | | 113,620 | |
| Soluble polymer | | | | | | | 2,560 | | 2,560 | |
| TiCl₃ | | 92 | | | | 92 | 92 | | 92 | |
| DEAC | | | | | | 78 | 78 | | 78 | |
| Acetylacetone | | | | | | | | | | 1,058 |
| Propylene oxide | | | | | | | | | | 230 |
| Ash | | | | | | | | | | |
| Total, lb./day | 105,534 | 92 | 14,700 | 30 | 282,222 | 78 | 282,300 | 44,350 | 326,650 | 1,288 |

| Stream Number | (16) | (17) | (18) | (19) | (23) | (24) | (25) | (26) | (27) | (28) | (29) |
|---|---|---|---|---|---|---|---|---|---|---|---|
| | Catalyst removal contactor effluent | Propylene to wash column | Washed polypropylene | Wash column overhead | Flash gas from cooler | Propylene recovered from washed polymer | Feed to second fractionator | Catalyst residue and soluble polymer | Recycle ethylene | Vent gases | Stripped propylene |
| Component, lb./day: | | | | | | | | | | | |
| Ethylene | 21,660 | 15,340 | 4,300 | 32,700 | 3,900 | 4,300 | 21,660 | | 20,260 | 1,210 | 30 |
| Propylene | 188,600 | 405,200 | 105,600 | 488,200 | 113,000 | 105,600 | 185,996 | 504 | 9,380 | 80 | 176,536 |
| Hydrogen | 40 | | | 40 | | | 40 | | 10 | 30 | |
| Polypropylene | 113,620 | | 113,620 | | | | | | | | |
| Soluble polymer | 2,560 | | | 2,560 | | | | 2,560 | | | |
| TiCl₃ | | | | | | | | | | | |
| DEAC | | | | | | | | | | | |
| Acetylacetone | 678 | | | 678 | | | | 678 | | | |
| Propylene oxide | 84 | | | 84 | | | | 84 | | | |
| Ash | 696 | | | 696 | | | | 696 | | | |
| Total, lb./day | 327,938 | 420,540 | 223,520 | 524,958 | 116,900 | 109,900 | 207,696 | 4,522 | 29,650 | 1,320 | 176,566 |

As used in above illustration, the first fractionator would contain about 40 fractionation trays of sieve or bubble type, be about 4 feet in diameter and 75 feet in height, operate at a pressure of 320 p.s.i.a. with a top temperature of about 120° F. and a bottoms temperature of 140° F. The overhead vapors are cooled to 110° F. by cooler 56 for condensation of the desired portion of the vapors. Stream 17 is removed from accumulator 57 at a temperature of 110° F. and a pressure of 312 p.s.i.a. and part of said stream flashed to a pressure of 20 p.s.i.a. with a resultant decrease in temperature to 20° F. The cold, flashed portion is passed through indirect exchanger 61 wherein it cools the remaining, non-flashed portion to covered and washed with an impure fraction of the monomers so reacted, the fraction being obtained by a fractionation of unreacted excess monomers to produce a stream containing catalyst and any soluble polymer, a stream containing a mixture of the monomers, using a portion of the stream of monomers as said impure fraction, fractionating another portion thereof to obtain one of the monomers for the homopolymerization and a mixture of the monomers for said copolymerization; in one embodiment the solid polymer being polypropylene-propylene-ethylene mixed copolymer, the washing of the product being affected employing a stream containing propylene and ethylene and there being obtained from the fractionator also a stream of propylene substantially free for said homopolymerization, ethylene and an ethylene-propylene stream for said copolymerization.

I claim:
1. A process for block copolymerizing two different hydrocarbon monomers to produce a solid mixed homo- and copolymer from monomers selected from monolefinic and conjugated diolefinic hydrocarbon monomers which comprises mass homopolymerizing a first monomer and then mass copolymerizing the polymer thus obtained with additional first and a second monomer, recovering and washing solid thus produced with an impure fraction of the monomers so reacted, the fraction being obtained by a fractionation of untreated excess monomers to produce a stream containing catalyst and any soluble polymer, a stream containing a mixture of the monomers, using a portion of the stream of monomers as said impure fraction, fractionating another portion thereof to obtain one of the monomers for the homopolymerization and a mixture of the monomers for said copolymerization.

2. A process according to claim 1 for the production of a solid mixed propylene-ethylene polymer which comprises in a homopolymerization zone homopolymerizing in liquid phase under homopolymerizing conditions and with a suitable catalyst, propylene in the substantial absence of ethylene, then, in a copolymerization zone under copolymerizing conditions and with a suitable catalyst, copolymerizing in liquid phase ethylene and propylene with homopolymer produced in said homopolymerization zone, recovering from said copolymerization zone a solid polymeric mass containing a mixed ethylene-propylene copolymer, containing a portion composed substantially only of polypropylene and a portion of ethylene-propylene copolymer, separating said solid polymeric mass from liquid phase, unreacted ethylene, propylene, catalyst and any liquid-phase soluble polymer by washing the same with an impure liquid propylene-containing liquid stream also containing ethylene, recovering said solid polymeric mass, passing the thus used impure liquid propylene liquid stream to a first fractionation zone, therein separating from the hydrocarbons as a bottoms stream, catalyst and soluble polymer, and as an overhead, a stream containing hydrocarbons, including ethylene and propylene, using a portion of said overhead as said impure liquid propylene-containing liquid stream for washing said solid polymeric mass, passing another portion of said overhead to a second fractionation zone, therein separating a first substantially ethylene-free propylene stream and second stream containing ethylene and propylene, passing said first stream to said homopolymerization zone, and passing said second stream to said copolymerization zone.

3. A process according to claim 2 wherein said stream containing hydrocarbons, including ethylene and propylene, which is obtained as an overhead, is partially condensed to produce an impure liquid propylene-containing stream and at least a portion of said stream, last mentioned, is used for washing said polymeric mass.

References Cited

UNITED STATES PATENTS

| | | | |
|---|---|---|---|
| 2,509,136 | 5/1950 | Cornell | 202—40 |
| 3,245,967 | 4/1966 | Moon et al. | 260—88.2 |
| 3,257,372 | 6/1966 | Moon | 260—93.7 |
| 3,280,090 | 10/1966 | Scoggin | 260—93.7 |
| 3,301,921 | 1/1967 | Short | 260—878 |
| 3,401,212 | 9/1968 | Griffin | 260—878 |
| 3,345,431 | 10/1967 | Harban | 260—878 |
| 3,358,056 | 12/1967 | Renaudo | 260—878 |

JOSEPH L. SCHOFER, Primary Examiner

S. M. LEVIN, Assistant Examiner

U.S. Cl. X.R.

260—879, 880 B